(12) United States Patent
Wentland et al.

(10) Patent No.: US 7,295,706 B2
(45) Date of Patent: Nov. 13, 2007

(54) PATTERN RECOGNITION APPLIED TO GRAPHIC IMAGING

(75) Inventors: Robert Wentland, Boulder, CO (US); Peter Whitehead, San Rafael, CA (US); Frederic S. Young, Los Altos, CA (US)

(73) Assignee: Chroma Group, Inc., Burlingame, CA (US)

( * ) Notice: Subject to any disclaimer, the term of this patent is extended or adjusted under 35 U.S.C. 154(b) by 674 days.

(21) Appl. No.: 10/318,324

(22) Filed: Dec. 12, 2002

(65) Prior Publication Data

US 2004/0008891 A1   Jan. 15, 2004

Related U.S. Application Data (60) Provisional application No. 60/395,959, filed on Jul. 12, 2002.

(51) Int. Cl.
*G06K 9/00* (2006.01)

(52) U.S. Cl. .................................. 382/181; 382/209

(58) Field of Classification Search .................... 435/6; 382/181, 209, 141, 190, 195, 294, 218, 224, 382/217, 254; 375/230, 233, 254, 350; 711/163; 707/102; 703/17
See application file for complete search history.

(56) References Cited

U.S. PATENT DOCUMENTS

| | | | | | |
|---|---|---|---|---|---|
| 5,182,805 | A | * | 1/1993 | Campbell | 711/163 |
| 5,308,751 | A | * | 5/1994 | Ohkawa et al. | 435/6 |
| 6,001,562 | A | * | 12/1999 | Milosavljevic | 435/6 |
| 6,014,461 | A | * | 1/2000 | Hennessey et al. | 382/195 |
| 6,151,424 | A | * | 11/2000 | Hsu | 382/294 |
| 6,221,603 | B1 | * | 4/2001 | Mahtani | 435/6 |
| 6,760,374 | B1 | * | 7/2004 | Tapp et al. | 375/233 |
| 6,763,064 | B1 | * | 7/2004 | Graf et al. | 375/230 |

\* cited by examiner

*Primary Examiner*—Anh Hong Do
(74) *Attorney, Agent, or Firm*—Baker Botts L.L.P.

(57) ABSTRACT

An apparatus and method for analyzing known data, and storing the known data in a pattern database ("PDB") as a template is provided. Additional methods are provided for comparing target data against the templates in the PDB. The data is stored in such a way as to facilitate the visual recognition of desired patterns or indicia indicating the presence of a desired or undesired feature within the new data. The apparatus and method is applicable to a variety of applications where large amounts of information are generated, and/or if the data exhibits fractal or chaotic attributes.

11 Claims, 7 Drawing Sheets

PATTERN RECOGNITION APPLIED TO GRAPHIC IMAGING

RELATED APPLICATIONS

This application is a conversion of U.S. Provisional Application Ser. No. 60/395,959 entitled "PATTERN RECOGNITION APPLIED TO GRAPHIC IMAGING" filed on Jul. 12, 2002, by inventors Robert Wentland, et al.; this application is also related to co-pending patent application Ser. No. 09/070,110, entitled "METHOD AND APPARATUS FOR BIOMATHEMATICAL PATTERN RECOGNITION," filed on Apr. 29, 1998; U.S. Provisional Application Ser. No. 60/395,960 entitled "PATTERN RECOGNITION APPLIED TO OIL EXPLORATION AND PRODUCTION" by Robert Wentland, et al., that was filed on Jul. 12, 2002; U.S. Ser. No. 10/308,928 entitled "METHOD, SYSTEM, AND APPARATUS FOR COLOR REPRESENTATION OF SEISMIC DATA AND ASSOCIATED MEASUREMENTS" by Robert Wentland, et al., that was filed on Dec. 3, 2002; U.S. Ser. No. 10/308,860 entitled "PATTERN RECOGNITION TEMPLATE CONSTRUCTION APPLIED TO OIL EXPLORATION AND PRODUCTION" by Robert Wentland, et al., that was filed on Dec. 3, 2002; Ser. No. 10/308,884 entitled "PATTERN RECOGNITION TEMPLATE APPLICATION APPLIED TO OIL EXPLORATION AND PRODUCTION" by Robert Wentland, et al.

FIELD OF THE INVENTION

The present invention relates generally to computer graphics. More particularly, the present invention relates to using pattern recognition in combination with graphic imaging on digital computers.

BACKGROUND OF THE INVENTION TECHNOLOGY

Many disciplines can benefit from pattern recognition. Disciplines where the benefit is greatest share characteristics and needs. Some common characteristics include large volumes of data, anomalous zones of interest that are mixed together with a large number of similar non-anomalous zones, timeframes too short to allow rigorous manual examination, and anomalies that manifest themselves in many ways, no two of which are exactly the same. Analysis of the data is usually done by highly trained professionals working on tight time schedules. Examples of these disciplines include, but are not limited to, hydrocarbon exploration and medical testing.

Exploring for hydrocarbon reservoirs is a very competitive process. Decisions affecting large amounts of capital investment are made in a time-constrained environment based on massive amounts of technical data. The process begins with physical measurements that indicate the configuration and selected properties of subsurface strata in an area of interest. The technical data include seismic signals (acoustic waves) that are introduced into the subsurface and reflected back to measurement stations on or near the surface of the Earth. A variety of mathematical manipulations of the data are performed by computer to form displays that is used by an interpreter, who interprets the data in view of facts and theories about the subsurface. The interpretations may lead to decisions for bidding on leases or drilling of wells.

Processing of seismic data has progressed hand-in-hand with the increased availability and capabilities of computer hardware. Calculations performed per mile of seismic data collected have increased many-fold in the past few years. Display hardware for observation by a human interpreter has become much more versatile.

When an interpreter uses data from the seismic process, it is used with some knowledge of geology of the area being investigated. The rationale for the decisions made based on the geologic information and the seismic data is not generally documented in detail. Therefore, it is difficult to review the history of exploration decisions using conventional procedures. The relative importance attached to the many characteristics shown in the seismic data and known from the geology is a subjective value that does not become a part of the record of the exploration process.

It is recognized that seismic data can also be used to obtain detailed information regarding producing oil or gas reservoirs and to monitor changes in the reservoir caused by fluid movement. Description of neural network modeling for seismic pattern recognition or seismic facies analysis in an oil reservoir is described, for example, in "Seismic-Pattern Recognition Applied to an Ultra Deep-Water Oilfield," *Journal of Petroleum Technology* August, 2001, page 41). Time-lapse seismic measurements for monitoring fluid movement in a reservoir are well known. The fluid displacement may be caused by natural influx of reservoir fluid, such as displacement of oil by water or gas, or may be caused by injection of water, steam or other fluids. Pressure depletion of a reservoir may also cause changes in seismic wave propagation that can be detected. From these data, decisions on where to drill wells, production rates of different wells and other operational decisions may be made. The neural network technique usually assumes that all significant combinations of rock type are known before analysis is started so that they can be used as a training set. This assumption is usually acceptable when analyzing fully developed fields but breaks down when only a few or no wells have been drilled. The implementation of the neural network technique usually requires using data of pieces of fixed thickness that is centered on the geology of interest. Selection of the location of the geology of interest is an input that is determined prior to the analysis. As the geology of interest is not always well known, the geology of interest should be a product of the analysis, not an input. Moreover, geology of interest rarely has a fixed thickness. The thickness varies significantly as the depositional process varies from place to place, sometimes by an amount that is sufficient to significantly degrade the result of the neural network analysis.

U.S. Pat. No. 6,236,942 B1 discloses a neural network-based system for delineating spatially dependent objects in the subsurface from seismic data. The application of neural networks to seismic data interpretation has been widely investigated.

U.S. Pat. No. 6,226,596 B1 discloses the use of a Voxel Coupling Matrix, which is developed using a finite number of neighboring voxels forming a textile. "Texture attributes" are developed. The attribute volumes are then used as inputs into an attribute-trace classification method to produce a seismic interpretation volume. The interpretation volume is displayed using distinct colors to represent various numbers of classes of reflection patterns present within the seismic volume. The textile technique has a significant trade off. While larger textiles (blocks of neighboring voxels) give better results, larger textiles smear out and blur the resulting image. Success in finding a textile size that gives results of adequate quality with sufficiently small blurring is often very difficult, especially when the rock layers are dipping rather than horizontally flat.

U.S. Pat. No. 6,151,555 discloses a workstation computer system and an associated method and program storage device. U.S. Pat. No. 6,131,071 discloses a method for processing seismic data to provide improved quantification and visualization of subtle seismic thin bed tuning effects and other lateral rock discontinuities. A reflection from a thin bed has a characteristic expression and the frequency domain that is indicative of the thickness of the bed. The method may be applied to any collection of spatially related seismic traces. Other methods of presentation of seismic data are disclosed in the patent and technical literature.

What is needed is a way to perform unsupervised pattern analysis that does not require a learning set, and that does not require a-priori knowledge of the location of the geology of interest. Unsupervised pattern analysis requires feature, pattern, and texture extraction from seismic data where the features, patterns, and textures are well chosen for optimal classification. Optimal means that they:

Have variable lengths so that they track the rocks, organs, tissues, or other items being analyzed;

Have the minimum number of measurements to maximize computation simplicity;

Have an adequate number of measurements to separate out the rock or tissue types as uniquely as the data allows;

Are intuitive to geoscientists physicians, or other specialists in that they measure the visual characteristics of the data that the geoscientists use when they visually analyze the data;

Determine the locations of the different rock or tissue types as a product of the analysis; and Use patterns, which are variable length spatial distributions of features, and textures, which are spatial distributions of patterns, in addition to features to perform the analysis.

There is further a need in the art to generate patterns visually, from features in a pattern abstraction database, and to generate the patterns from multiple features. From a production standpoint, there is a need in the geoscience art to visually analyze the interior of a hydrocarbon reservoir more effectively. There is also a need in the medical art to examine the interior organs more effectively. Direct hydrocarbon or tumor indicators, for example, should be visually identifiable. Seismic stratigraphy should be used in a way that includes all the seismic stratigraphic information available in the data.

According to "The Basics of MRI," by Joseph P. Hornak, Ph.D. (which is available online at: http://www.cis.rit.edu/htbooks/mri/):

"Magnetic resonance imaging ('MRI') is an imaging technique used primarily in medical settings to produce high quality images of the inside of the human body. MRI is based on the principles of nuclear magnetic resonance ('NMR'), a spectroscopic technique used by scientists to obtain microscopic chemical and physical information about molecules. The technique was called magnetic resonance imaging rather than nuclear magnetic resonance imaging ('NMRI') because of the negative connotations associated with the word nuclear in the late 1970's. MRI started out as a tomographic imaging technique, that is it produced an image of the NMR signal in a thin slice through the human body. MRI has advanced beyond a tomographic imaging technique to a volume imaging technique."

While MRI produces finely detailed images of structures and features within the human body, it does not interpret those images. A trained physician or specialist performs the interpretation. Unfortunately, reliance upon a relatively few qualified individuals increases the cost of the interpretation process and limits the number of interpretations that can be made within a given period. This makes current MRI techniques impractical for standard screening procedures. As in seismic analysis, there is a need in the art for a knowledge capture technique where the data for MRI that the specialist looks at is captured by a pattern recognition process. Ideally, the pattern recognition process would be repeated for large amounts of data in a screening process, with the results displayed in an intuitive manner so that the specialist can quickly perform quality control on the results, and correct noise induced errors, if any.

There is further a need in the art for a way to auto-track textures, patterns, and features in order to isolate and measure rock bodies or body tissues of interest. Preferably, an object should be auto-tracked so that its location is determined both by the properties of its interface with surrounding objects, and by the difference between the features, patterns, and textures in the objects interior when compared to those outside the object. This tracks the object directly rather than tracking the object solely based on the varying properties of the interface which, by itself, is unlikely to be as descriptive of the object. Interface tracking tracks the object indirectly, as would be done with boundary representations. An example of automatically detecting objects based on their interior and interface characteristics would be in colorectal cancer screening where the target anomaly (a colorectal polyp) has both distinctive interface and interior characteristics.

Moreover, a data analysis specialist should not be required to rely on analysis of non-visual measures of object characteristics. The information describing the visual characteristics of seismic data or tissue information, should be stored in a way that allows the specialist to interact with the information to infer and extract geological or medical information and to make a record of the exploration process. Finally, a way should be provided to analyze geologic or medical information with varying levels of abstraction.

These needs are shared across many disciplines yet the specific nature of the data and the characteristics of the anomalies vary across disciplines and sometimes within a single problem. Thus, there is a need in the art for a common method of analysis that can be applied to a wide variety of data types and problems, yet can be adapted to the specific data and problem being solved in situations where required.

SUMMARY OF THE INVENTION

The present invention solves many of the shortcomings in the prior art by providing an apparatus system and method for analyzing known data, storing the known data in a pattern database ("PDB"), and providing methodology and apparatus for comparing new data to the stored data in such a way as to facilitate the visual recognition of desired patterns or indicia indicating the presence of a desired or undesired feature within the new data. The present invention is applicable to a variety of applications where large amounts of information are generated. These fields include, but are not limited to, seismic studies in the petrochemical industry; imaging of body tissues to detect the presence of, for example, cancerous tumors; detection of particular gene sequences in large amounts of DNA; and economic studies of large numbers of autonomous consumers.

In general, the present invention computes features, be they geologic, medical, or other feature, using a specific methodology to compute patterns within that feature base.

The patterns are a transformation, which classifies features based on their spatial distribution. The same transformation, when applied to patterns, can form the texture of the images further facilitate recognition by the operator of the present invention.

The present invention can accept large amounts of information and convert the data into features, patterns, and textures (that are stored and displayed as voxels). Displaying and analyzing the feature, pattern, and texture information requires displaying multiple measurements for the same spatial location (voxel). Up to four pieces of information can be displayed simultaneously using false color imagery ("FCI").

However, it is not simply what is done, but of equal importance is how it is done. Specifically, it is the order in which the tools of the method of the present invention are used that provides the great benefits of the present invention. In general, the method of the present invention first assembles the data. Thereafter, features, patterns, and textures are generated. The patterns and textures use the "vertical to fragment" cluster analysis of the pattern space. This latter step is particularly useful for pattern matching. Then an interpreter (typically a human) employs the data to interpret the results to determine if desirable (or undesirable) features are present. It is preferable to use false color imaging (such as RGBA and HSVA) to display simultaneously up to four features, patterns, or textures of the data in order to facilitate the recognition of certain types of geology as revealed in the seismic data or medical information, or other type of information. In a sense, the use of false color imaging allows the specialist to classify visually the data by modifying the color assignments to separate uniquely out the objects of interest base on up to four feature, pattern and texture measures of the data.

The present invention makes extensive use of templates for knowledge capture. Templates are pattern signatures of features used to find like structures. Known patterns found in templates can then be compared, in an automated fashion, to new data to detect similar patterns and hence find the desired features in the new data. The templates also contain all of the processing and display parameters required to start with an initial data set and create a final product in a batch data computer run without human intervention.

BRIEF DESCRIPTION OF THE DRAWINGS

Referring now to the drawings, the details of the preferred embodiments of the invention are schematically illustrated.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF THE PREFERRED EMBODIMENTS

The present invention is preferably implemented as a set of one or more software processes on a digital computer system. However, the present invention may also be implemented purely in hardware, or may be virtually any combination of hardware and software.

The present invention utilizes a pattern database that is derived from known data, as a reference center for estimating the constituent elements of target data. The pattern database employs a DNA-like pseudo sequencing technique to process the known data that goes into the pattern database. The target data is processed in the same manner as the known data. An "affinity" or "binding strength" is determined by an operator and the two sets of data compared. The form of the processed data, as well as the binding strength, enable the identification of patterns in the target data that match the desired patterns that were identified previously in the known data. The operator of the present invention can then identify points of the target data that correspond to desired characteristics of points in the known data. The pattern database building process is both flexible and scalable, and is capable of application in fields as diverse as geophysics and medicine.

The following are definitions of terms that are used in the description of the present invention. Terms not defined herein retain their common usage.

Abstraction Process: An abstraction process is a process of successive identification of features, patterns, and textures within data and storing the results of each step into a layer within a pattern database.

Affinity: See Binding Strength.

Auto-track: Auto-track is the process of building objects by identifying spatially connected zones with a common attribute, collection of attributes, a common hyperdimensional fragment, or satisfying a template.

Attribute/Attributing: Intuitively, an attribute is a characteristic or measurement of data. For the purposes of the present invention, attribute is defined as the measurements used to characterize the data at a given level of the pattern pyramid. Examples of attributes are features, patterns, and textures. In addition to characterizing the data, attributes can characterize the cuts or the boundary representation of objects after segmentation. Examples include local curvature measurements on the exterior of a segmented geological reservoir in geoscience, or colon in medical studies. Attributing is the processing of determining attributes.

Attribute Location: An attribute location is the physical starting and ending location in the data set defining the location of an attribute.

Binding Strength: Binding strength is a threshold that is supplied by the operator that sets the degree of match required to determine if the known data matches the target data. The binding strength allows the present invention to recognize patterns in data that contains defects or noise, or where a perfect match is not required. Binding strength is implemented as the threshold of values for each level of a hyperdimensional fragment.

Classifiers: A classifier is a computational method (algorithm) that sorts out data into various sets with common characteristics or classes. See template.

Classification: Classification is the process of applying classifiers or templates. For the purposes of the present invention, classification is the process of identifying hyperdimensional fragments in the pattern database of the target data set that match, within a given binding strength, the hyperdimensional fragments of a known data set.

Cut/Cutting: Cutting is the process of subdividing the data into a collection of one-dimensional fragments.

Cutting Criteria: A cutting criteria is a method and related parameters for creating fragments. The specific method depends on the nature of the data and the objective of the analysis. The simplest example is to choose a fixed length of data samples. A more complex method is to perform cuts based on changes in the data values such as sign changes, identification of edges, and others. Either of the above examples result in cuts with varying spatial lengths. Variable length cuts give rise to a topological surface that has measurable characteristics or attributes. While cuts of variable spatial lengths are possible, cuts of uniform length are also possible.

Data Mining: Data mining is the process of applying templates from a template database to one or many target data sets creating output objects, in scenes, that satisfy the template.

Decision Surface: A decision surface is a surface that separates two or more classes during classification. For the present invention, a decision surface exists for each level of abstraction, such as the feature level, pattern level, and texture level and is defined by a hyperdimensional fragment plus a non-zero binding strength that performs classification at each of the levels of abstraction. A template is a concatenation of the decision surfaces for each level of abstraction.

Edge: An edge occurs where the data or attribute(s) of the data changes significantly at a given spatial location. In other words, an edge occurs at locations where the derivative of the attribute(s) has a peak. In reality, edges are often not sharp and are obscured by various noises in the data. Also, see segmentation and cutting.

Feature: A feature is the smallest interpretable and classifiable measurement that can be made on the data. A feature is one member of a feature set. Also, see feature set, visual feature set, and feature space.

Feature Location: A feature location is the physical starting and ending location that defines the spatial position of a feature.

Feature Set: A feature set is a set of feature attributes that represent the state of the data or image at each feature location in the image. Different feature sets are selected to classify data in various ways. Also, see feature, visual feature set, and feature space.

Feature Space: Mathematically, specifically topologically, a feature set is represented by a vector space (state space), called a feature space, where each axes of the space is a feature attribute. The smallest feature attribute set, which is also the computationally most efficient set, is described mathematically as a set, or basis of the vector space, where each member of the set is linearly independent. Linearly independent means that one axes, or set member, is not a linear combination of the other set members. Each feature attribute represents a degree of freedom of the image. When all of the degrees of freedom are represented as feature attributes, then the feature set, which is also the basis of the vector space, are described as spanning. Intuitively spanning means that a feature set can be recombined to exactly recreate the data from which it was measured. In practice a feature set capable of spanning the feature space is defined, but to reduce computation time only the features required to solve the problem are computed.

Fragment: A fragment is a one-dimensional interval that has a physical size and spatial location. It is the smallest interval at the given spatial location within which attributes can be measured. Fragments may be defined as having a fixed physical length or include a fixed number of attribute values. They may also have a variable physical length where the fragment is cut using cutting criteria that are a function of the data, attributes, or statistics of any lower level in the pattern pyramid. Variable length fragments usually lay between data value, attribute, or statistic edges. Fragments are cut at each of the feature, pattern, or texture levels of the pattern pyramid. Also, see fragment sequence.

Fragment Orientation: When the data being analyzed has more than one dimension, a fragment orientation must be chosen while cutting the data into fragments. For example, 3D seismic is often measured in a three dimensional space with three axes, x, y and z. Thus, the fragment orientation can be aligned along any of these three axes. Another option is to align the fragment orientation along an alternate coordinate system, such as a geology or a tissue aligned manifold.

Fragment Sequence: A fragment sequence is the sequence of data, attribute, or statistic values that occur within a fragment.

Global Statistic: A global statistic is a statistical comparison of the value of the attribute of interest at a particular location in a data set to the value of this attribute at all locations of the data set. Also, see statistic and local statistic.

Hyperdimensional Fragment: A hyperdimensional fragment is a fragment that extends vertically through the various levels of a pattern pyramid. It represents an ordered collection of attributes containing members from each level. At each level, the hyperdimensional fragment contains a single point and the associated attribute value. If required, a binding strength, which is a set of thresholds representing a range of values about the attributes at each level above the data level, can be used. It is defined for both known data and target data and is used for the simultaneous classification of features, patterns, and textures. See template and classification. Mathematically, topologically, the hyperdimensional fragment is a fiber view of the tangent spaces represented by the levels of the pattern pyramid. In terms of pattern recognition, the hyperdimensional fragment represents a classifier derived from the known data that is used to perform classification of the target data.

Known Data: Known data is a specified portion of a data set containing either an analog that is a known characteristic, or an example that is composed of a subset of the data that is identified by a user/expert as a potential specific characteristic. The known data is chosen to include the item of interest primarily, and little else.

Local Statistic: A local statistic is a statistical comparison of the value of the attribute of interest at a particular location, to the value of this attribute in a local coordinate neighborhood. The size of the path is operator selected. Also, see statistic and global statistic.

Object: An object is a spatially connected body within a scene that has a common attribute, hyperdimensional fragment (collection of attributes), or fits a template. The defined object is not to be confused with a software object that can be used to implement the present invention. Software objects retain their standard meaning for purposes of this disclosure.

Object Attribute: An object attributes are the measurable properties that is associated with an object's boundary representation or outside edge. An example of an object attribute is the local curvature of the exterior surface of an object.

Object Space: An object space is a manifold space that represents either the exterior boundary of an object, or the interior of an object. An example of a 3D manifold is the surface on the outside of an object. Another example is the 3D manifold representing the interior of a colon as observed on an MRI or a CT scan during a virtual colonoscopy.

Pattern: A pattern is a naturally occurring repeat of feature attributes in a fragment sequence. Also, see Pattern Space.

Pattern Database (PDB): A pattern database is a database that consists of one or more levels of attributes (usually features, patterns, and textures) within a data set. The pattern database can be a relational database containing the attributes. The pattern database can also be an object database containing the attributes as parameters and the reduction process computations as methods plus other parameters and methods if required for data handling and/or display.

Pattern Location: The pattern location is the physical starting and ending location that defines the spatial position of a pattern.

Pattern Pyramid: A pattern pyramid is a diagram that represents the pattern database. The pyramid sits on a broad rectangular base representing the data. A triangle sets on the base that decreases in width upward. The triangle can have one or more levels. Generally, however, there are three levels consisting of, from bottom to top, features, patterns, and textures. The width at each level represents the number of fragments at that level, which decreases as the level of abstraction increases. Mathematically, topologically, the levels of the pattern pyramid represent tangent spaces of the data set.

Pattern Recognition: Pattern recognition is the analysis of data for making a decision. Pattern recognition involves making measurements on the data (pattern attributes and data statistics), analyzing the measurements (classification) and making a decision (computing a decision surface).

Pattern Space: Pattern space is determined by a transformation from feature space to pattern space. Pattern space is an abstract vector space (state space) where each axes of the space represents a degree of freedom of the patterns in the image. Each location in the fragment sequence ($N_F$) and each member of the associated feature set represent the degrees of freedom ($N_M$). Thus, the pattern space has a dimension of $D=N_F \times N_M$. For example, a fragment sequence of length 3 with only 1 measured feature is a 3D space. There are several methods of assigning pattern attribute values. One is to identify clusters in pattern space, assign numbers to the clusters, and use the cluster number as the pattern attribute number. A second is to simply bin the space and assign the bin numbers to the pattern attributes. A third is to identify the location where the pattern maps into pattern space and use the coordinates as pattern attribute values. In practice, the pattern space may be estimated more efficiently by transforming only selected portions of the feature space. Also, see pattern.

Physical Space: The physical space is the space within which the data is measured or sampled. In general, the physical space is usually a Euclidean space. For problems where the space on which the patterns of interest occur has not been distorted, attribute calculations are performed on the physical space. For example, most 3D data is collected in a Cartesian coordinate system where the axes of the physical space are inline, x, y, and z.

Scene: Intuitively, a scene is a spatial region that is viewable and contains one or more objects. It is analogous to a room that is being viewed by an observer where the room contains furniture objects and people objects, all of which can be viewed. For the purposes of the present invention, a scene is a collection of objects. It is implemented as an integer data cube that contains integer numbers that represent object numbers plus a null value. Data points containing the null value represent null zones, which are not assigned to objects. Zones containing object numbers are assigned to the objects associated with the specific numbers.

Statistic/Statisizing: Statistic is the methods of analyzing the attributes of each layer in the PDB for the purpose of analyzing the probability of a selected occurrence of the attribute occurring elsewhere in the entire data set, or in a selected local coordinate neighborhood. Statisizing is the process of applying the statistic method. Also, see local statistic, and global statistic.

Target Data: Target data is a data set that is to be analyzed. Examples include seismic for geoscience, ultrasound for medical, X-ray for medical, MRI for medical, CT for medical, optical for satellite photography, or other forms of measurements. Target data is usually in the form of a 3D voxel cube although higher or lower spatial dimensions or analog data may also be used. In terms of pattern recognition, target data is a data set to be classified into targets and non-targets by the hyperdimensional fragment that functions as a classifier.

Template: Intuitively, a template is a sorting device for selecting a subset of a data collection where each member of the subset matches the template. A template is implemented in software as a collection of one or more decision surfaces. For the purposes of the present invention, a template contains a hyperdimensional fragment representing the pertinent contents of the pattern database of a known data plus the binding strength. It is applied to the hyperdimensional fragments of the PDB of a target data set to identify targets. In addition, a template can contain decision surfaces that are related to object attributes that are properties of the objects boundary representation. An example is selecting objects for which the local curvatures lie within a given range of values as defined by decision surfaces in the template.

Template database: A template database is a database that contains one or more templates. A template database can be stored as data files, in a relational database, or in an object database.

Texture: Intuitively, a texture is the visual characteristic of a cloth that is composed of closely interwoven threads where the threads have unique patterns. A texture is a measurement of the order of repeated patterns in a series of spatially adjacent fragment sequences. Also, see Texture Space.

Texture Location: The texture location is the physical starting and ending location that defines the spatial position of a texture.

Texture Space: A texture space is mathematically (topologically) an abstract vector space (state space) that is computed as a transformation from a pattern space to the texture space. The transformation is computed in the same way as transforming from feature space to pattern space with the exception that the input is a pattern space. In practice, the pattern space may be estimated more efficiently by transforming only selected portions of the feature space. Also, see texture.

Visual feature set: A visual feature set is a feature set that is designed to classify data based upon the data's visual appearance. An instance of a visual feature set is the one a shipping company uses to classify packages. The feature set is measurements of boxes including length, width, height, and shape (square, rectangular, etc.). Another example is the features used by a graphic artist to measure the properties of a pixel in an image that includes three features: the amount of red, the amount of blue, and the amount of green. A third example is a visual feature set that is used by seismic stratigraphers and interpreters to analyze band-limited acoustical impedance (inverted seismic) includes distance between zero crossings, maximum amplitude, and shape (skewed upward, skewed downward, single peak, multiple peaks, shoulder). Also, see features.

Voxel cube: A voxel cube is a 3-dimensional, regular, ordered, quadmesh that represents discreet measurements in Euclidean space. A voxel cube is also referred to as a 3D pixel.

Overview

The goal of the pattern database process is to generate characteristics of disparate types of known data so that, when the known data is compared to the target data, only the subsets of desired characteristics need to be considered. The known data and the target data both undergo a "reduction" process that is typically accomplished in several layers and, within each layer, one or more sets of cutting, attributing, and statisizing. Moreover, the precise method of cutting, attributing, and statisizing can change from layer to layer, or within a layer itself. During the reduction process, as more and more data are synthesized, the amount of data needed for further analysis is reduced. However, the basic pattern of the process remains the same throughout.

The pattern database building process has four main steps that are applied to one or more layers of data abstraction. The pattern database building process starts with one or more sets of known data, and a set of data to be analyzed (the "target data"). The known data and the target data are then subjected to a series of steps within the reduction process. Typically, the known data and the target data are an array of two-dimensional ("2-D data"), but any set of input data (of any dimensionality) will suffice. Incidentally, this reduction process can take place separately. There is no need to reduce the known data contemporaneously with the target data. Consequently, to accelerate the analysis process, the sets of known data are processed first and the results are saved as templates. The various templates form a part of a database of patterns that can be compared to the target data, hence the term "pattern database." Known data can be pre-analyzed (in a variety of ways) and stored in one or more mass storage devices, for retrieval when needed. The pre-processed known data can then be compared to the target data that has been processed in a manner similar to the known data.

Correction Step

In some cases, the input data (either known and/or target) may need to be "corrected" in some manner to make it more suitable for reduction and/or analysis. For example, the raw input data may be provided in an Euclidean format. However, seismic data, and medical data, are often better expressed in an alternate coordinate system, such as a feature-oriented or circular geometric system. The present invention accommodates a transformation from, for example, physical space, to an alternate coordinate system. Such things as azimuth centering, with corresponding correction in dip and azimuth, can be applied to the data and saved within the pattern database of the present invention.

1. Cutting

The first step of the reduction process (for each data set) is to cut the data into fragments to create a set of fragments. Each fragment can contain one or more pieces of one-dimensional information. It should be noted that fragment sets are generally one-dimensional. If two-dimensional data is used, then two sets of fragments may be generated, one for each dimension. Similarly, if three-dimensional data is analyzed, three sets of fragments can be generated, and so on. Examples of such input data include, but are not limited to, the R-G-B color and/or intensity level at a particular pixel of a 2-D image, the acoustic impedance information obtained from seismic exploration, and many others. In the preferred embodiment of the present invention, a pre-defined or operator-supplied criterion is applied to the data to generate the fragments. Because the cut criterion remains constant while the underlying data typically varies, the resulting fragments are often variable in length. It should be noted that, while the criterion for a step of cutting typically remains constant, the specific criterion can vary from process to process, or from layer to layer. The specific criterion that is applied is a function of the problem being analyzed. Although variable length fragments are preferred, some problems are amenable to using fixed-length fragments, and the present invention can easily accommodate fixed-length fragments.

Figure 3:
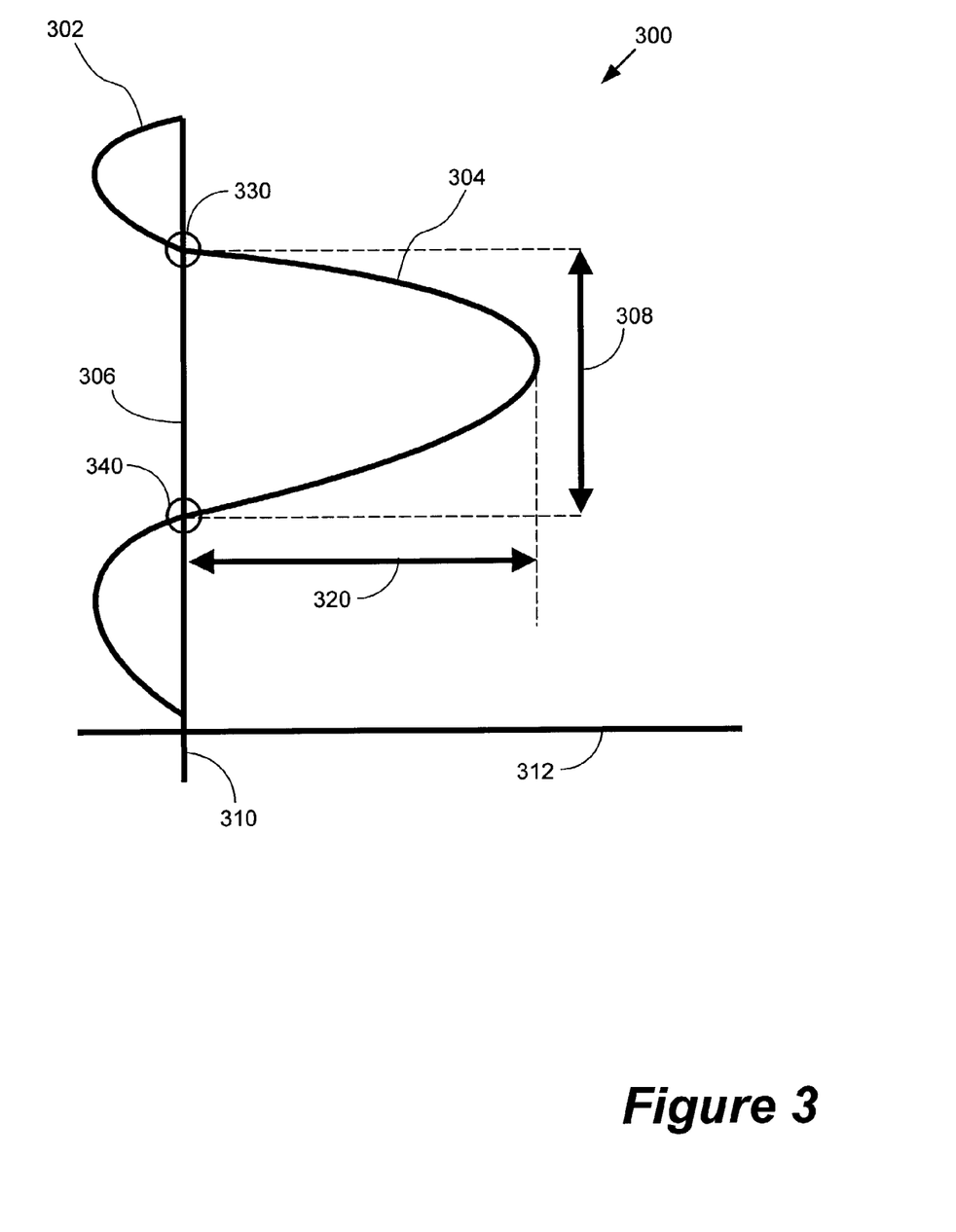
FIG. 3 is a diagram of an example of fragment cuts according to the teachings of the present invention.
Figure 4:
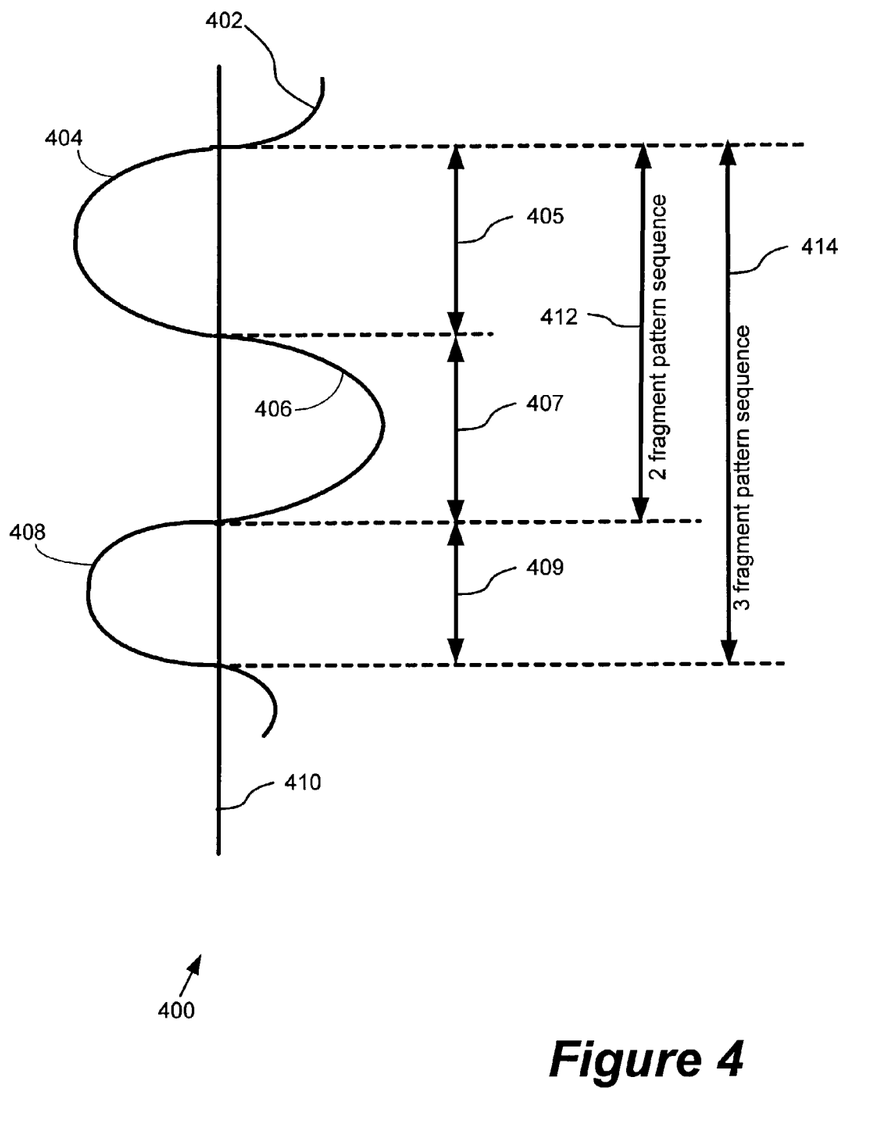
FIG. 4 is a diagram of an alternate example of fragment cuts according to the teachings of the present invention.
Figure 5A:
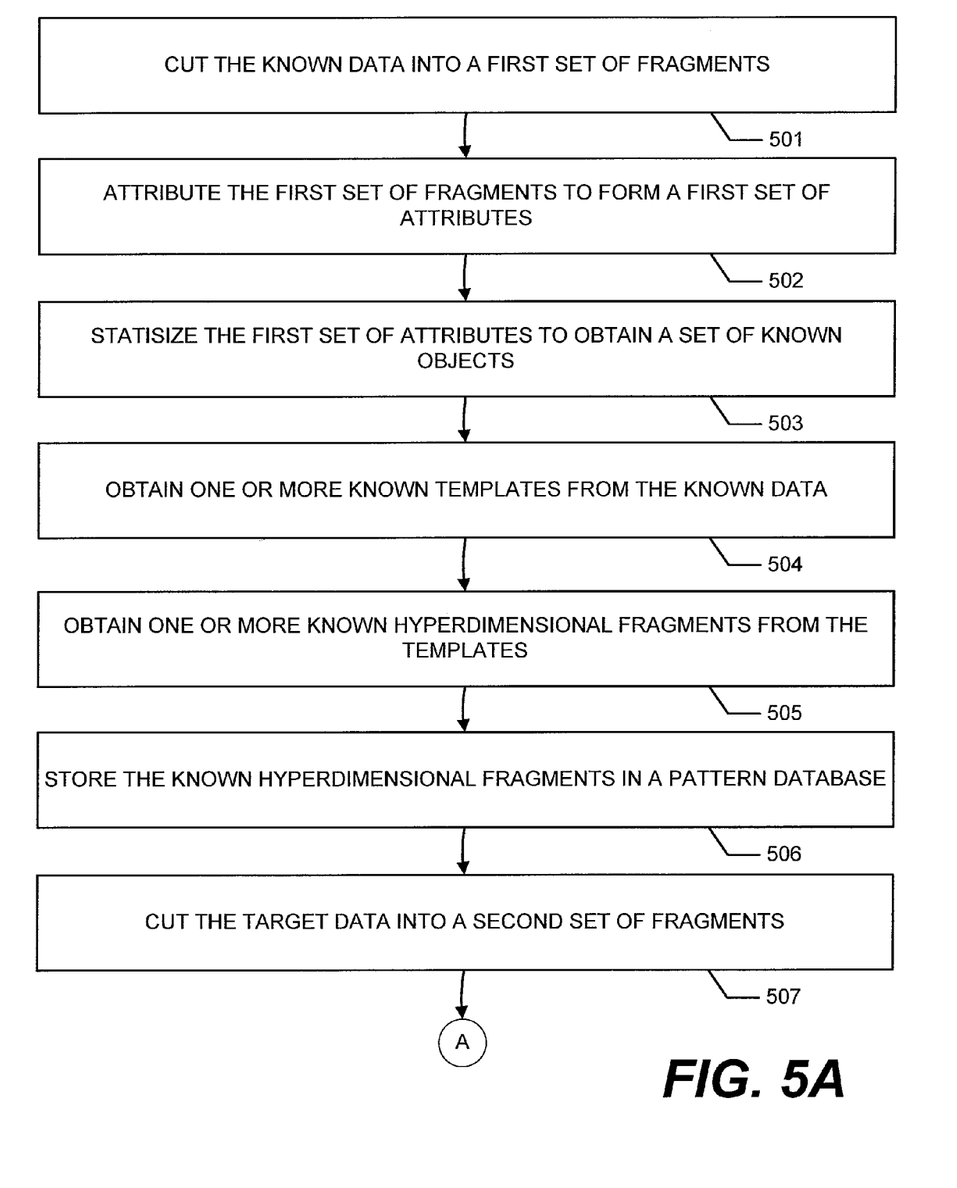
FIG. 5 is a diagram of the first three steps of the data reduction process according to the teachings of the present invention.
Figure 5B:
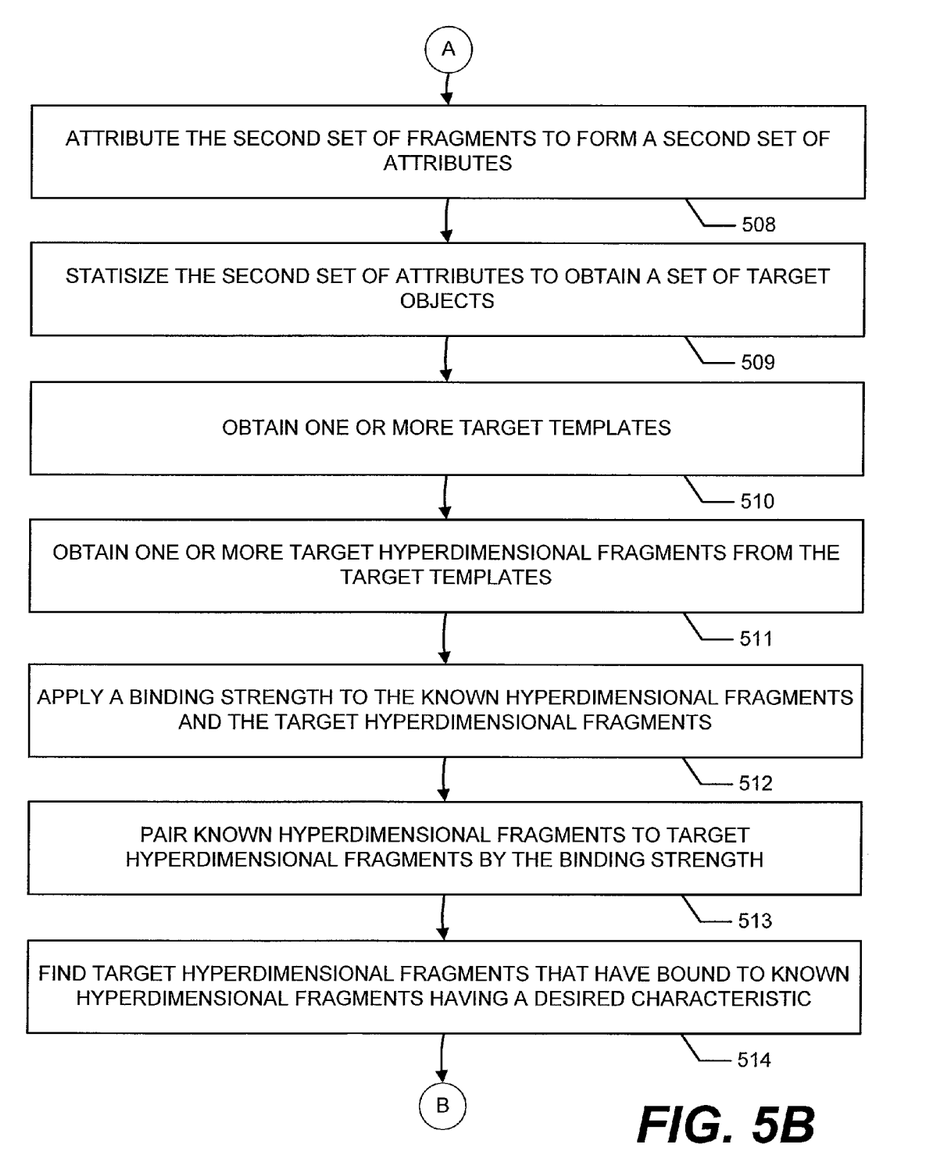
Figure 5C:
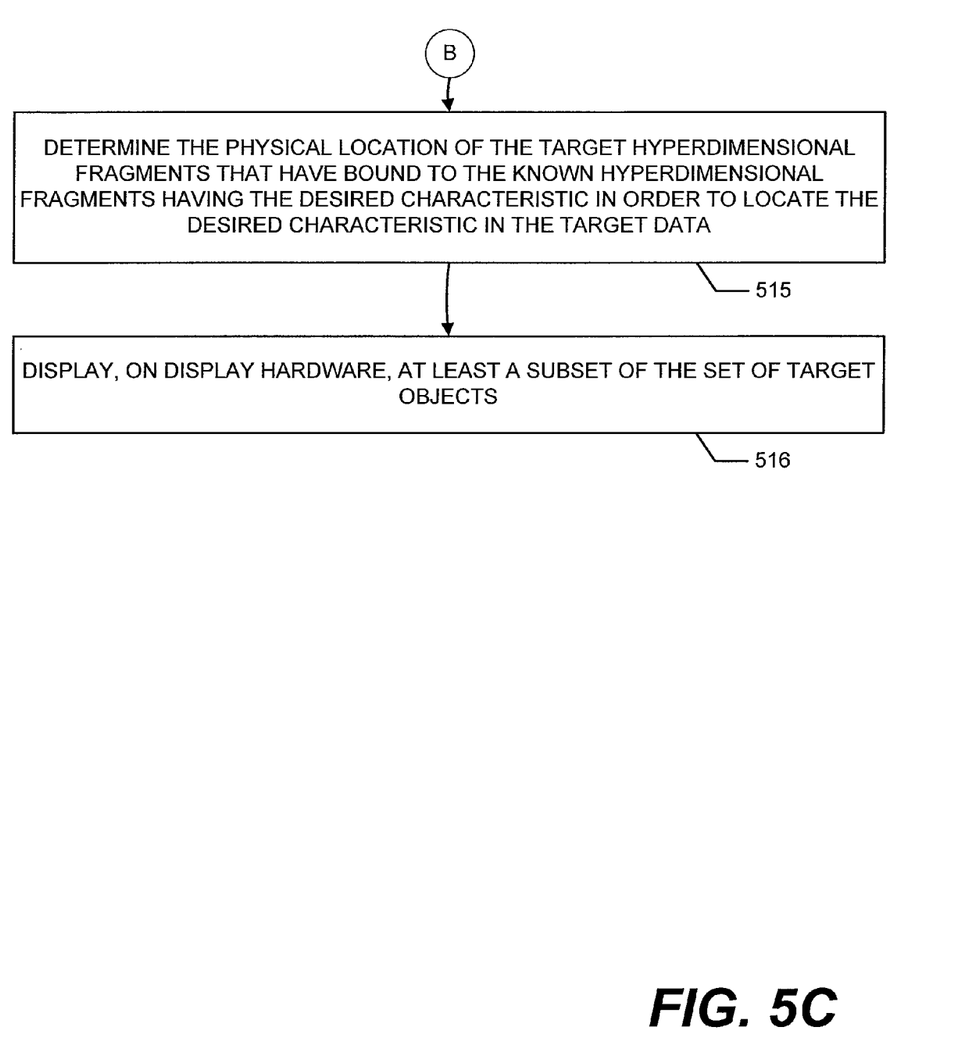

FIG. 3 illustrates a portion of data (either known or target) that can be represented as a curve 302 on a coordinate system 300 having an X-axis 312 and a Y-axis 310. In the example of FIG. 3, the data 302 crosses the Y-axis 310 at two locations 330 and 340. The inflection points 330 and 340 can be used to demarcate the length 308 of a fragment of data, namely curve 304. The fragment 306 thus has a length 308 and an amplitude 320 as illustrated A second example is illustrated in FIG. 4. The data 402 passes through the axis 410 in four places to form three data segments 404, 406, and 408 having fragment lengths 405, 407, and 409, respectively. Fragments can also be combined with, for example, neighboring fragments to form a fragment sequence, such as the two-fragment pattern sequence 412 and three-fragment pattern sequence 414.

It should be noted that the choice of the grid coordinate system that is overlaid upon the underlying analog raw data might cause edge noise. For optimum performance, the edge noise should be eliminated or attenuated. As was noted earlier, the length of the fragments may well vary, particularly if the underlying analog data is non-periodic. Variable-length fragments, as well as fixed-length fragments, are easily handled by the present invention.

Other statistical data may also be attributed to the attribute in order to provide a better illustration of, for example, a manifold (the topology of the feature). Statistical information may also be used to predict attributes of the next higher level, which may preclude the need for the computation intensive activity of calculating attributes at that next level. Such statistical data can be saved as properties of the particular fragment or attribute within the pattern database of the present invention.

2. Attributes

In the second step of the reduction process, the attributes of each fragment are generated. Such attributes may include, e.g., the length of the fragment, the shape of the curve that the data of the fragment represents, or the physical location of the fragment within the original data, etc. Other attributes may include the thickness of the curve, the shape of the curve, and the amplitude of the curve represented by the fragment. The specific attributes may be stored in the pattern database, or as properties of software objects that may be stored in RAM or an object database, or in an appropriately mapped relational or object-relational database, or via some other storage technique or mechanism.

3. Statistics

The third step of the process is the statistical analysis of the various attributes and/or fragments. In general, the statistical analysis that is applied is a function of the dimensionality of the target data set (e.g., a local/global match of parameters). For example, a statistical determination can be made on how common a shape amplitude is for a fragment among the local set of attributes, and/or on the global set of attributes. Moreover, the local match of parameters can be based upon the local statistics, or the abridged local statistics. If the abridged local statistics are used, then only those attributes within the adjacent fragments are utilized. Alternatively, if the local statistics are used, then the attributes of a particular region (regardless of fragment length) are utilized. The statistical step of the present invention can also be used to include correction parameters, or to add new parameters. Finally, the statistical analysis may also be used to predict the attributes of another level. For example, the statistical analysis at the pattern layer 106 (see FIG. 2) may be used to predict the attributes of the texture layer 108, or the feature layer 104.

Figure 2:
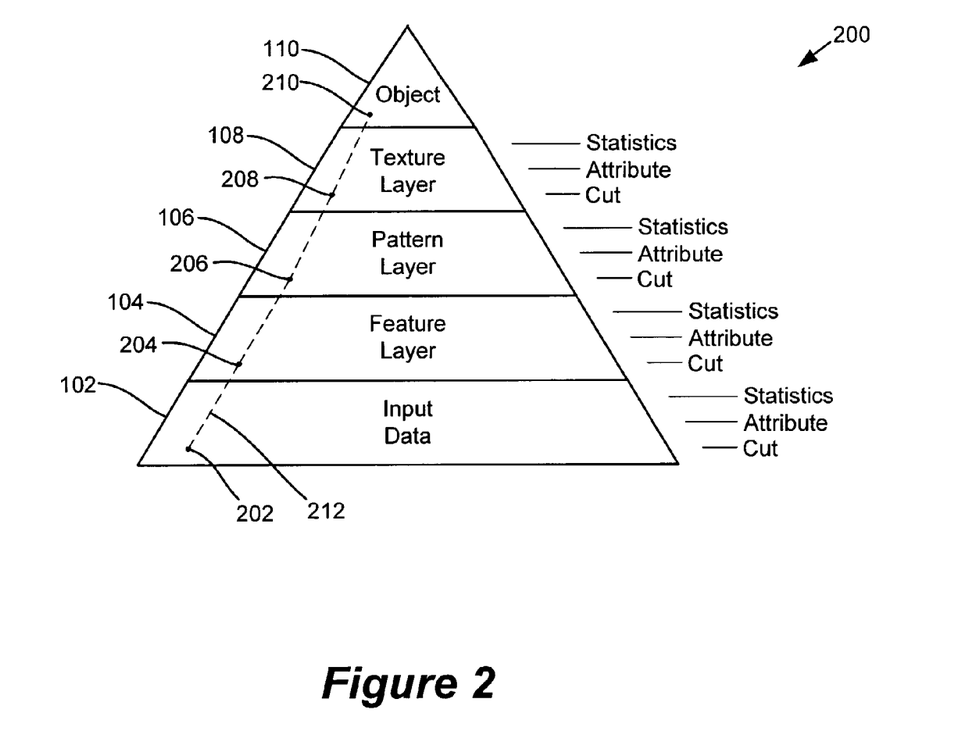
FIG. 2 is a block diagram illustrating the synthesis process according to the teachings of the present invention.

The three steps of the reduction process as outlined above are applied, at least once, to each level of abstraction, regardless of the type of abstraction at that level, until an object is obtained as illustrated in FIG. 2. Moreover, the three steps of the process may be applied multiple times at any of the levels of abstraction. In the preferred embodiment, the output of a lower layer is used as the input for the next higher layer, although each layer may have its own set of input data and/or have its own respective result. Furthermore, the specific criteria used at each step of the process may be the same, or may vary, both between steps, within the particular level of abstraction, and/or between levels of abstraction.

Figure 1:
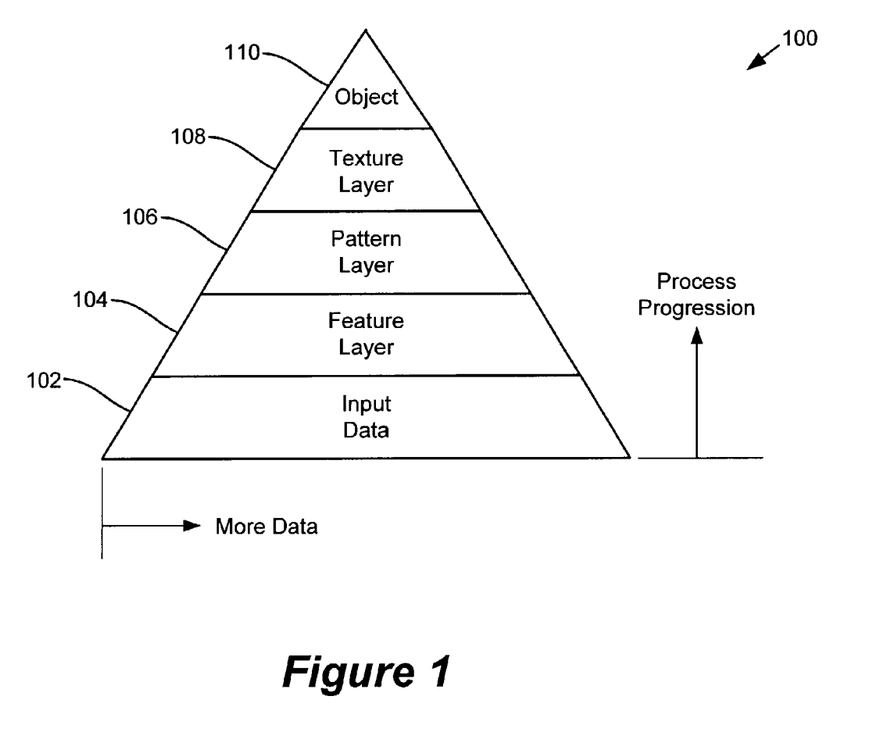
FIG. 1 is a block diagram illustrating the pattern pyramid according to the teachings of the present invention.

An exemplary embodiment of the layers of abstraction associated with the method of the present invention, as outlined above, is illustrated in FIG. 1. At the bottom of the pyramid 100 lie the input data. The width at the base of the layer is generally indicative of the amount of data involved within that stage of the method of the present invention. The wider the base, the more data involved. As the process outlined above is applied at each layer of abstraction, the amount of data that need to be analyzed at subsequent layers is reduced, leading to the pyramid-shaped illustration of FIG. 1. The three-step reduction process that was outlined above may be invoked, with varying criteria, repeatedly. The specific criteria used in each step of the process, and the number of times the reduction process is repeated, depend upon the type of problem encountered and the type of information represented by the data.

In the exemplary embodiment, there are three layers of abstraction between the input data 102 (see FIG. 1) and the object 110. The reduction process is first applied (at least once) to the input data to generate the feature layer 104. Thereafter, the reduction process is applied (at least once) to the feature layer data to generate the pattern data 106. Next, the reduction process is applied (at least once) to the pattern layer data to generate the texture layer 108. Finally, the reduction process is applied (at least once) to the texture layer data to generate the object 110. While the exemplary embodiment illustrated in FIG. 1 has three intermediate layers of abstraction between the input data 102 and the object 110, only one intermediate layer is essential. On the other hand, should the analysis call for it, any number of intermediate layers may be generated between the input data 102 and the object 110. Thus, the method of the present invention is dimension independent, and the method may be applied to any n-dimensional problem. How many intermediate layers are generated, or how they are generated (i.e., how many times the cut/rearrange/attribute process is applied), is problem-specific.

FIG. 2 illustrates how a particular point of space in the input data 102, represented by the point 202, has corresponding points 204, 206, 208, and 210 in the feature layer 104, pattern layer 106, texture layer 108, and object 110, respectively. These points 202, 204, 206, 208, and 210 form a trajectory called a template of the point in question. The template trajectory forms a hyperdimensional fragment. Each hyperdimensional fragment (of both the known data and the target data) can be stored in a database for later retrieval. Because the type of reduction analysis is problem specific, so too is the resultant template trajectory and hyperdimensional fragment.

4. Binding Strength

Once the underlying raw data have been processed as discussed above, a comparison between the known data and the target data can be accomplished by comparing the known data (in the form of the known-data hyperdimensional fragments) to the target data (in the form of their respective hyperdimensional fragments). A useful analogy is to liken the hyperdimensional fragments to DNA snippets, with each layer value of the hyperdimensional fragment corresponding to a base. The known "DNA" is then compared to the target "DNA." The known "DNA" snippets are allowed to find similar DNA snippets from the target data. Whether or not a particular set of known and target hyperdimensional fragments are declared similar enough to each other to provide a meaningful result is a function of the binding strength. The higher the binding strength, the higher the affinity between a known-data hyperdimensional fragment and a target-data hyperdimensional fragment. The process of pairing hyperdimensional fragments can take place in a population pool that is analogous to those used in genetic algorithms. Alternatively, a temporary database can be used to sort the known and target hyperdimensional fragments based on the binding strength criteria. The sorting or reorganization of the set of hyperdimensional fragments is typically accomplished according to the dimensionality of the target data set. In other words, the fragments of the known data set and the target data set that were grouped together and bound in the previous steps, are reorganized into the same or dissimilar pairs. The binding strength criteria can, for example, pair fragments having exactly the same layer values, or layer values of a certain range, or matches of values for multiple levels, or near matches (or mismatches) of multiple levels, or other criteria. Generally, the exact kind of binding strength criterion is problem-specific.

The reorganization of the hyperdimensional fragments into pairs is based upon criteria that may be statistically based, or applied subjectively by the database generator with a view toward comparing such data to the target data set. Moreover, it is unlikely that each known-data hyperdimensional fragment will pair only with a single target-data hyperdimensional fragment. Instead, one or more known-data hyperdimensional fragments may bind with a single target-data hyperdimensional fragment, and vice versa.

Once the target data hyperdimensional fragments have been "paired" with the known data hyperdimensional fragments, the user can then identify the known-data hyperdimensional fragments that represent desirable characteristics (such as oil and gas deposits, or cancerous lesions) and thus identify the paired target-data hyperdimensional fragments. Once the paired target-data hyperdimensional fragments are identified, it is a simple matter to extract their physical location within the input target data. The present invention, therefore provides a useful way to identify constituent components in one set of data based upon characteristics of known sets of data, and does so in a way that is independent of the dimensionality of the underlying data, and is not dependent upon the physical location of the desired characteristics. Furthermore, the method of the present invention is applicable to a variety of problems, and provides a scalable solution that can be adapted easily to screening tasks.

The method of the present invention may be implemented as a process operating on a digital computer, such as a personal computer (not shown). Specifically, the method of the present invention may be implemented as one or more software processes that operate on one or more digital computers in a serial and/or parallel fashion. In the preferred embodiment of the present invention, the software processes are constructed from one or more software objects. The database used to store the templates and hyperdimensional fragments can be a relational database, an object database, or an object-relational database that can be operative with the same digital computer, or another digital computer that is connected via a local area network, or a wide area network, a storage area network, or the like. It will be understood that the software processes needed to utilize the method of the present invention may also be implemented in hardware, such a in an application specific integrated circuit ("ASIC") or in any combination of hardware and software.

The invention, therefore, is well adapted to carry out the objects and to attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those of ordinary skill in the art. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for comparing known data to target data comprising:
    cutting the known data into a first set of fragments;
    attributing the first set of fragments to form a first set of attributes;
    statisizing the first set of attributes to obtain a set of known objects;
    obtaining one or more known templates from the known data;
    obtaining one or more known hyperdimensional fragments from the templates;
    storing the known hyperdimensional fragments in a pattern database;
    cutting the target data into a second set of fragments;
    attributing the second set of fragments to form a second set of attributes;
    statisizing the second set of attributes to obtain a set of target objects;
    obtaining one or more target templates;
    obtaining one or more target hyperdimensional fragments from the target templates;
    applying a binding strength to the known hyperdimensional fragments and the target hyperdimensional fragments;
    pairing known hyperdimensional fragments to target hyperdimensional fragments by the binding strength;
    finding target hyperdimensional fragments that have bound to known hyperdimensional fragments having a desired characteristic;
    determining the physical location of the target hyperdimensional fragments that have bound to the known hyperdimensional fragments having the desired characteristic in order to locate the desired characteristic in the target data; and
    displaying, on display hardware, at least a subset of the set of target objects.

2. The method of claim 1, wherein the steps of cutting, attributing, and statisizing form a layer.

3. The method of claim 2, wherein the steps of cutting, attributing, and statisizing can form two or more of the layers.

4. The method of claim 3, wherein a first criteria is applied to the step of cutting.

5. The method of claim 3, wherein disparate criteria may be applied to each of the cutting steps.

6. The method of claim 3, wherein a first criteria is applied to the step of attributing.

7. The method of claim 3, wherein disparate criteria may be applied to each of the attributing steps.

8. The method of claim 3, wherein a first criteria is applied to the step of statisizing.

9. The method of claim 3, wherein disparate criteria may be applied to each of the statisizing steps.

10. The method of claim 3, wherein the result of the statisizing may be used as the input for a next cutting step in a subsequent layer.

11. The method of claim 1, wherein, before the step of cutting, transforming a coordinate system from a physical space to an alternate coordinate system.

* * * * *